United States Patent
Funakoshi et al.

[11] Patent Number: 5,156,203
[45] Date of Patent: Oct. 20, 1992

[54] AIR CONDITIONING SYSTEM

[75] Inventors: Sunao Funakoshi, Ibaraki; Kazuya Matsuo, Tsukuba; Hiroo Nakamura, Tsuchiura; Hiroaki Matsushima, Ryugasaki; Daisuke Hisajima, Ibaraki; Akira Nishiguchi, Ushiku; Takatoshi Yamamoto, Ibaraki; Tomomi Umeda, Ibaraki; Katsuhiko Hashimoto, Ibaraki, all of Japan

[73] Assignee: Hitachi, Ltd., Tokyo, Japan

[21] Appl. No.: 685,546

[22] Filed: Apr. 15, 1991

[30] Foreign Application Priority Data

Apr. 16, 1990 [JP] Japan ..................... 2-97662

[51] Int. Cl.$^5$ ................. G06F 15/20; G05D 23/00
[52] U.S. Cl. ..................... 165/12; 235/375; 236/51
[58] Field of Search ............ 236/1 R, 51, 94; 165/12; 235/375

[56] References Cited

U.S. PATENT DOCUMENTS

| | | | |
|---|---|---|---|
| 4,861,967 | 8/1989 | Yoshimura | 235/375 X |
| 4,958,502 | 9/1990 | Satoh et al. | 236/94 X |
| 5,055,658 | 10/1991 | Cockburn | 235/375 X |

FOREIGN PATENT DOCUMENTS

2590381  5/1987  France .............. 236/46 R

Primary Examiner—William E. Wayner
Attorney, Agent, or Firm—Antonelli, Terry, Stout & Kraus

[57] ABSTRACT

The present invention relates to air conditioning systems and more particularly to an air conditioning system which provides air conditioning in each of a plurality of spaces. The air conditioning system according to the present invention divides a space with partitions into a plurality of air conditioning spaces and controls the temperature by cooling and heating mediums supplied from an external heat source using a three-way valve and an expansion valve. The air conditioning system includes an ID card for identifying a person which uses the air conditioning system. If a person is present to use the air conditioning system, the set or measured values of the environmental conditions for that person is stored. When that person again uses the air conditioning system, the system calculates the environmental conditions stored by the person in accordance with his stored set or measured environmental condition values. Each of the individuals' preferred comfortable environments is automatically realized by calculating the set values for that person in accordance with his current or past set conditions independent of the space. Changes to his preference to the environmental conditions are easily made.

29 Claims, 15 Drawing Sheets

FIG. 5
| FREQUENCY OF OPERATIONS | △ | ▽ | CHANGE |
|---|---|---|---|
| 1 | SLIGHTLY RAISE | SLIGHTLY LOWER | 0.5°C |
| 2 | RAISE | LOWER | 1°C |
| 3 | CONSIDERABLY RAISE | CONSIDERABLY LOWER | 2°C |
FIG. 6
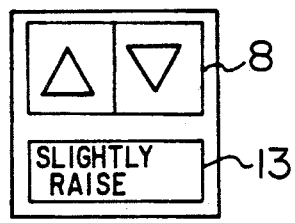
FIG. 7
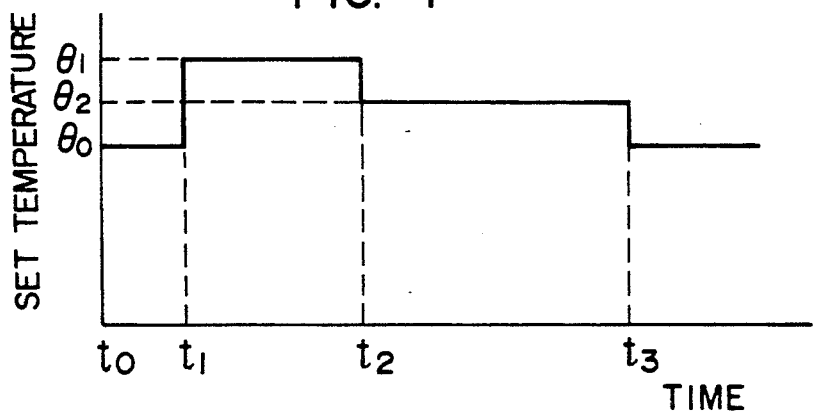
FIG. 8
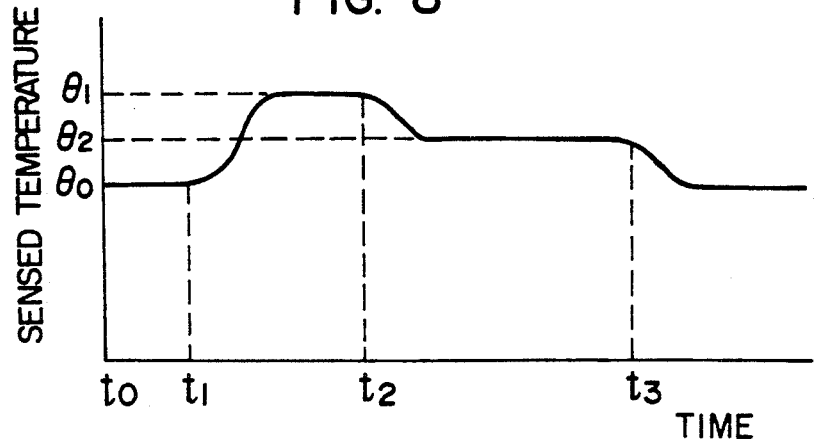

AIR CONDITIONING SYSTEM

BACKGROUND OF THE INVENTION

The present invention relates to air conditioning systems and more particularly to an air conditioning system which provides air conditioning in each of a plurality of regions.

A conventional air conditioning system provides air conditioning in one entire room at a set temperature, as disclosed in JP-A-02-8231 and JP-A-02-252961. A room air conditioning system is provided with an IC card for conditioning air in accordance with the set temperature and wind quantity conditions stored on the IC card.

The above conventional technique provides air conditioning, for example, in one entire room to put the air conditioning in the set conditions. If there are a plurality of persons in the same room, the above technique does not allow for dividing the room into a plurality of regions and then providing air conditioning in each of the respective regions. Thus, they do not provide air conditioning which satisfies the respective persons.

SUMMARY OF THE INVENTION

It is a first object of the present invention to provide an air conditioning system which automatically realizes comfortable air conditioned environments suitable for the respective individuals on the basis of the individuals' set conditions or past conditions of use of the system.

It is a second object of the present invention to provide an air conditioning system which automatically realizes the respective environments preferred by the individuals even if they come to different air conditioned regions.

It is a third object of the present invention to provide an air conditioning system which easily satisfies individuals' changing preference to comfortableness.

It is a fourth object of the present invention to provide an air conditioning system which provides a sensation of comfortableness directly after the beginning of air conditioning.

It is a fifth object of the present invention to provide an air conditioning system which provides a comfortable space containing illumination, scent, etc.

It is a sixth object of the present invention to provide an air conditioning system which is easy to increase and expand.

In order to achieve the first object, the air conditioning system according to the present invention divides a space with partitions into a plurality of regions, adjusts in the respective regions the cooling and heating mediums supplied from an external heat source using a three-way valve and an expansion valve. Means (for example, an ID card) is provided for identifying a person which uses the air conditioning system. If there are in the respective regions persons who use the air conditioning system, the set or measured values of the environmental conditions for each of the persons are stored. When that person again uses the air conditioning system, the system calculates the environmental conditions preferred by that person in accordance with his stored set or measured environmental condition values.

In order to achieve the second object, the air conditioning system according to the present invention includes a communications line by which storage means forming part of a controller provided in each region is connected with a storage of another controller for referring purposes.

In order to achieve the third object, the air conditioning system according to the present invention includes a temperature adjusting switch which corresponds to personal data used several times in the past to calculate his environmental conditions, and stores the results.

In order to achieve the fourth object, the air conditioning system according to the present invention monitors a comfortableness evaluation index at a substantially constant value by changing the wind speed until the temperature arrives at the set value.

In order to achieve the fifth object, personal data on illumination, OA devices, scent, etc., are stored for air conditioning purposes.

In order to achieve the sixth object, the storage for set conditions, resistance conditions, etc., is shared by all the associated system elements.

According to the present invention, firstly, air conditioning is provided in each of the partitioned spaces at any desired set temperature. Each person's set or measured values of the environmental conditions are stored and the set values used next time are calculated on the basis of the former values to thereby realize an environment comfortable for that personal. Since the person identifying means is provided, the condition setting is made automatically at the beginning.

Second, a communications line is provided to communicate with any one of the plurality of storage means which store environmental condition set or measured values, provided in the corresponding regions, can be referred to, so that the conditions preferred by a person can be set in any region.

Third, even if the preferred environmental conditions change, the environmental conditions for a person are calculated by reference to his past data which has been stored several times, so that setting corresponding to a change in his preference is easily made.

Fourth, the wind speed is changed such that the comfortableness evaluation index is substantially constant, so that comfortableness is available directly after the use of the air conditioning system.

Fifth, illumination, scent, etc., can be made ones preferred by a person who uses the space.

Sixth, storage means for storing the individuals', environmental condition set or measured values is provided and is shared by all the associated system elements, so that the system may be increase and extension of the system is easily performed.

BRIEF DESCRIPTION OF THE DRAWINGS

FIG. 5 illustrates a temperature setting method.

FIG. 6 illustrates the appearance of a set condition display board.

FIGS. 7 and 8 illustrates a method of determining an initial set temperature value.

DESCRIPTION OF THE PREFERRED EMBODIMENTS

An embodiment of the present invention will be described below with reference to FIGS. 1-8.

Figure 1:
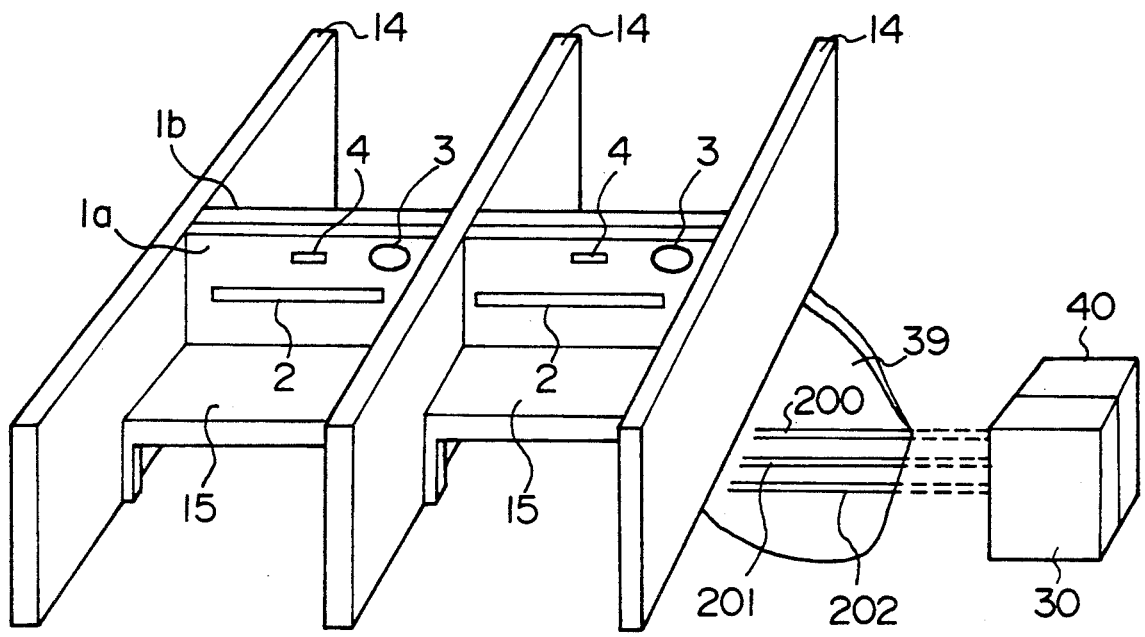
FIG. 1 is a perspective view of an air conditioning system as one embodiment of the present invention.
Figure 2:
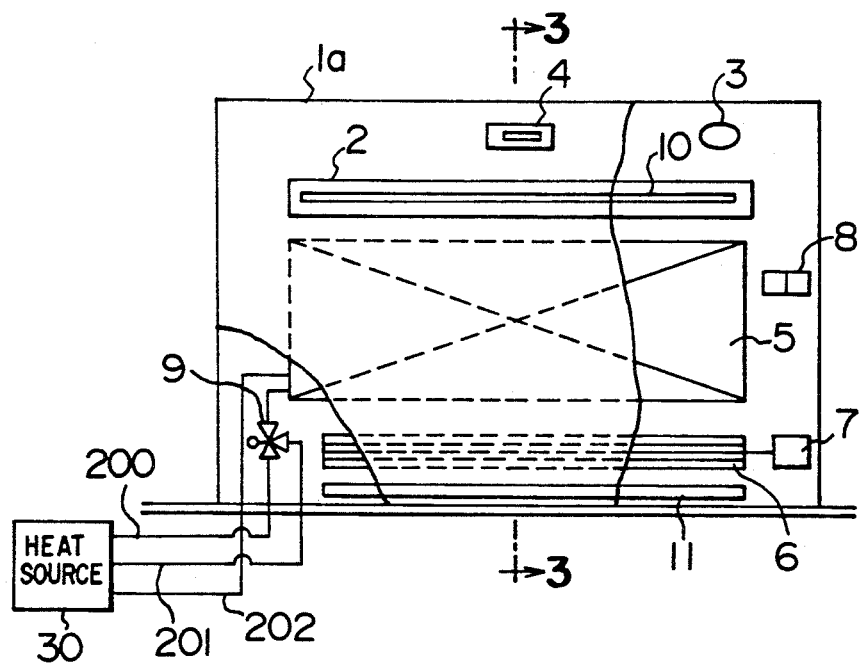
FIG. 2 is a front view of partitions of FIG. 1.
Figure 3:
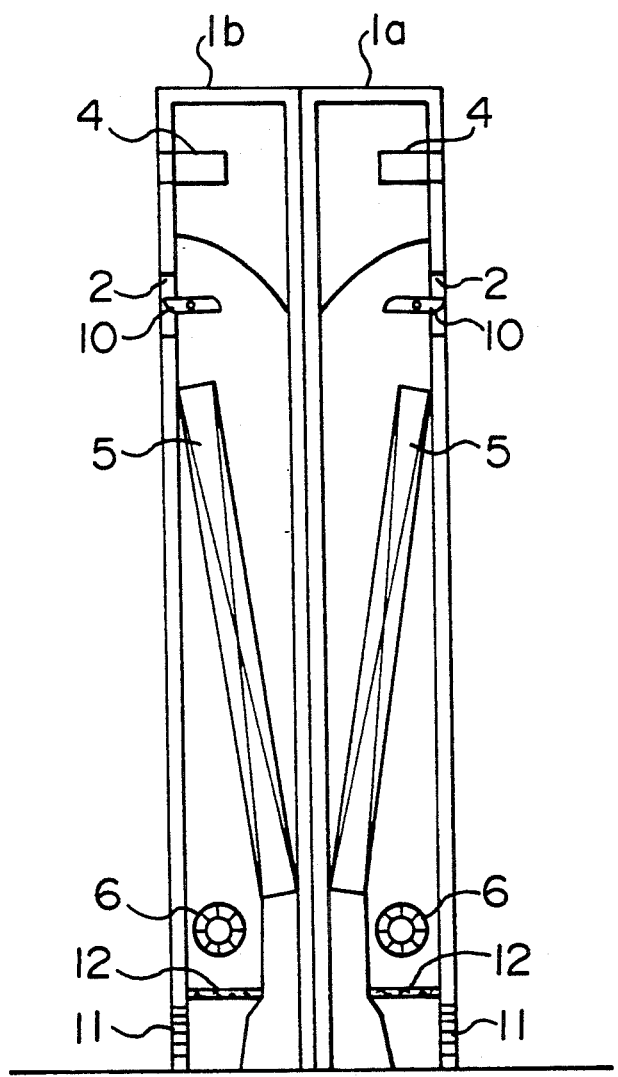
FIG. 3 is a cross sectional view taken along the line A—A of FIG. 2.
Figure 4:
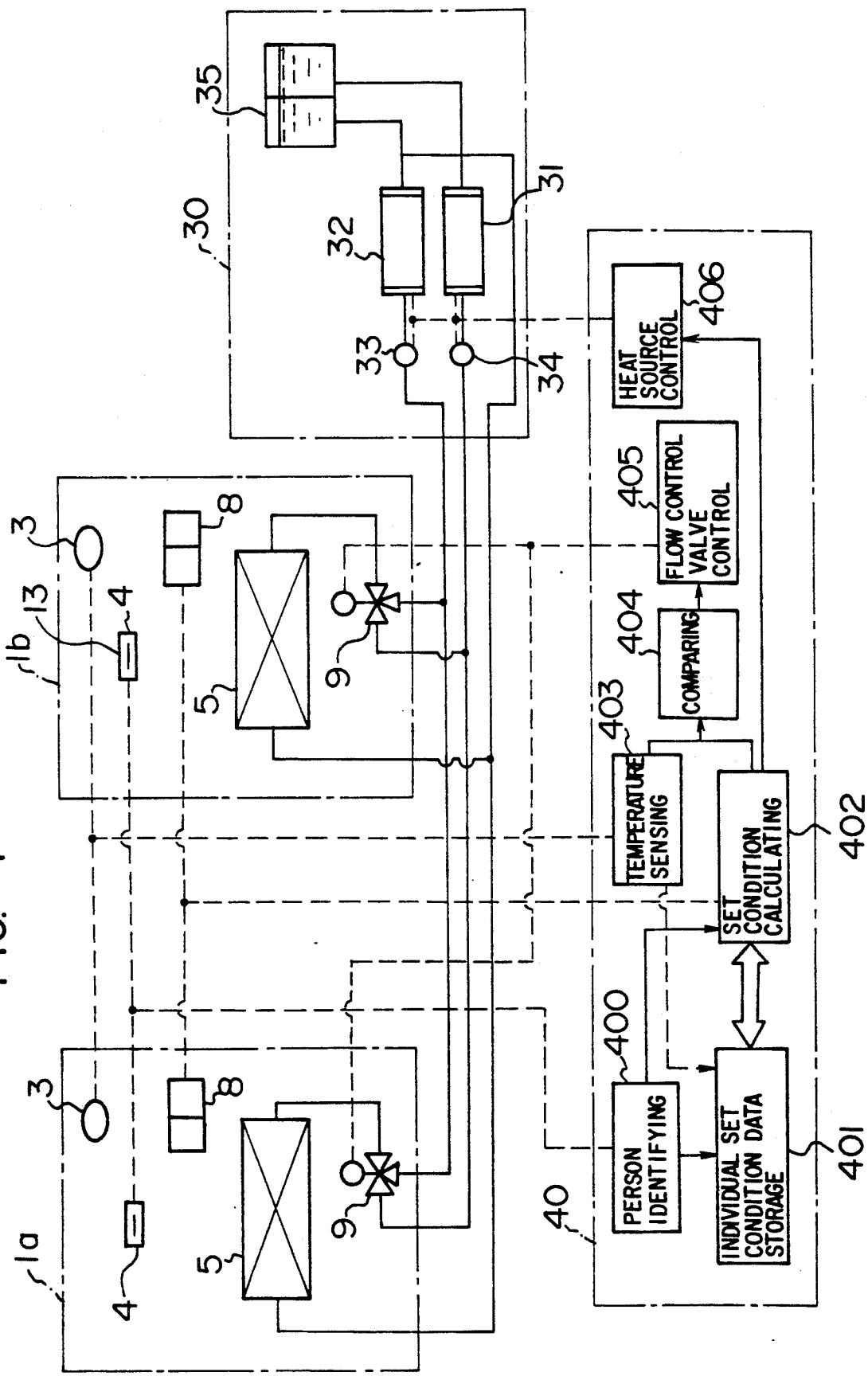
FIG. 4 is a schematic of the system.

FIG. 1 is a perspective view of an air conditioning system as one embodiment of the present invention. FIG. 2 is a front view of partitions of FIG. 1. FIG. 3 is a cross sectional view taken along the line A—A of FIG. 2. FIG. 4 is a schematic of the system. FIG. 5 illustrates a temperature setting method. FIG. 6 illustrates the appearance of a set condition display board. FIGS. 7 and 8 illustrates a method of determining an initial set temperature value in the air conditioning system.

In FIGS. 1-3, the numerals 1a, 1b each denote a partition to divide a room into a plurality of regions. Partition 1 has an air blowout port 2, temperature sensor 3, card reader 4, heat exchanger 5, fan 6, fan motor 7, temperature adjusting switch 8, flow control valve (or three-way valve) 9, wind direction plate 10, suction port 11, and filter 12. Partition 14 has no air blowout port, and has a desk 15 attached thereto. While in FIG. 1, the pair of partitions is provided as a example, the number of partitions may be increased. Numerals 200-202 each denote a water pipe which extends through space 39 under the floor to connect a heat source 30 and a heat exchanger 5 within each of partitions 1a, 1b. Heat source 30 provides two kinds of water mediums different in temperature due to heating or cooling. These kinds of water mediums different in temperature are guided through pipes 200, 201 to flow control valve 9 as temperature adjusting means within each of partitions 1a, 1b, mixed in valve 9, the resulting medium enters heat exchanger 5 where it exchanges heat with the air there and then returns to heat source 30 through water pipe 202. Flow control valve 9 and heat source 30 are controlled by controller 40. As shown in FIG. 3, the air for air conditioning is suctioned through suction port 11 by the rotation of fan 6, guided to heat exchanger 5 through filter 12, heated or cooled in heat exchanger 5 for temperature adjustment and then blown out through air blowout port 2. Heat source 30 includes cooler 31, heater 32, pumps 33, 34 and water source 35, as shown in FIG. 4.

The operation of the air conditioning system of the present embodiment will be described below with reference to FIG. 4. First, when the air conditioning system is used, a person inserts a card which indicates his identification code which has been recorded, for example, using a magnetic system (hereinafter referred to as an ID card) into card reader 4 on a desk 15 which he uses. If the ID card is inserted into the card reader, person identifying means 400 identifies the user of the ID card. In this case, the person identifying means 400 identifies the person's identifying code. Storage means 401 stores the individuals' past preferred temperature conditions. Calculating means 402 calculates an initial set temperature for the person on the basis of the data on his ID card. Individual temperature data storage means 401 stores changes in the set temperatures and sensor sensed temperatures as shown in FIGS. 7 and 8.

The calculation of the set temperature is performed as follows:

(1) First, when the person who first uses the air conditioning system inserts his ID card, the setting temperature is set to a predetermined standard or initial value. Thereafter, when temperature adjusting switch 8 is manipulated to change the set temperature, the range of change of the set temperature by the manipulation is predetermined, for example, as shown in FIG. 5. While in the present embodiment the range of change is arranged to be changed by a constant value depending on the frequency of pressing the switch, it may be changed as a function of the set temperature. Alternatively, as shown in FIG. 6, provision of an indication plate 13 with a display such as "slightly raise" for changing the set value may serve to provide easy manipulation. FIG. 7 shows an illustrative change of the set temperature in which the axis of abscissas denotes time and the axis of ordinates set temperature. FIG. 7 shows that ID card is inserted into ID card reader 4 at a time $t=t_0$, that the "raise" operation is performed at a time $t=t_1$ and that the "slightly lower" operation is performed at a time $t=t_2$, and the ID card is removed at a time $t=t_3$. At this time, the temperature sensed by the sensor changes as shown in FIG. 8.

(2) The following methods are conceivable for providing an initial set temperature when the person uses the air conditioning system:

1) The temperature which has been set for the longest interval of time is used as the initial value (in FIG 7, $\theta_2$ is handled as the initial value.):

2) The average value of the set temperatures is used as the initial value given by $$\theta_{in} = \Sigma_i \frac{\Delta t_i}{T} \theta_i$$

where $\theta_{in}$ is the initial value, $\Delta t_i = t_{i+1} - t_i$, and $T = \Sigma_i \Delta t_i$ (see FIG. 7):

3) The average value of the temperature sensed by the sensor is used as the initial value $\theta_{in}$ given by $$\theta_{in} = \frac{1}{T} \int_0^T \theta_s(t)dt$$

where $\theta_s(t)$ is the temperature sensed by the sensor; and

T is the time interval in which the air conditioning system is used.

(3) There are the following methods of setting the initial value of a set temperature when the third use and so fourth of the air conditioning system are made:

a) The value obtained from the methods 1)-3) in the previous use of the air conditioning system is used as the initial value; and b) The initial value is calculated from the set temperature or the sensor sensed temperature in the past predetermined time, using the 1)-3) methods. If the past data is used for reference, the data used several times in the past is stored in memory, and handled as successive data, and the initial value is calculated using the methods 1)-3).

If the initial value is determined using one of these methods, a transitional situation continues and data is unstable for a short time after the start of every use of the system (when the ID card is inserted), so that the initial value is preferably calculated except for that data.

Set condition calculating means 402 sets an initial temperature using one of the above methods. When temperature changing switch 8 is operated, it changes the set temperature.

Heat source 30 includes cooler 31, heater 32, pumps 33, 34, and water source 35 so as to supply cold water and hot water to partitions 1a, 1b. Heat source control means 406 controls the respective temperatures of the cold and hot water and the flow of water through pumps 33 and 34. Normally, it controls the temperatures of cold and hot water and the flow of water through the pumps so that the flow is constant.

Each temperature sensor 3 and temperature detector 403 measures the temperature around that temperature sensor 3 or the temperature of air in the region defined by the partition, and comparator 404 compares the resulting data with the set temperature. Flow control valve control means 405 control flow control valve 9 in accordance with the difference between the set temperature and the sensed temperature. Heat source control means 406 refers to the sensed temperature while controlling heat source 30. When temperature adjusting switch 8 is operated, set condition calculating means 402 changes the set temperature. The series of these operations is performed for each of the partitions.

If the sensor sensed temperature is lower than the set temperature for each of the partitions, control is provided such that either the output of heater 32 is increased or the output of cooler 31 is decreased. If the sensed temperature is higher than the set temperature for each of the partitions, control is provided such that either the output of cooler 31 is increased or the output of heater 32 is decreased. Also, if the difference between the set temperatures for the respective partitions is great and it is difficult to set the respective partitioned regions to desired temperatures using only the control of flow control valve 9, additional temperature control is provided by operating cooler 31 and heater 32.

According to the present embodiment, even if any of the persons is within any of the respective partitioned region, this region is set to the temperature, which that person prefers, on the basis of data on his past set temperature values or measured temperature values. This temperature is set by the person inserting his ID card into card reader 4 thereby provide comfortable air conditioning.

Since temperature adjustment is provided by mixing hot water and cold water for each partition, temperature setting is made in each of the partitioned regions as well as simultaneous cooling and heating operations are performed to thereby provide satisfactory air conditioning in spite of the presence of a possible partially high load device such as a computer.

While many temperature setting methods for the individuals are conceivable, as mentioned above, flexible air conditioning conforming to the number of persons, the status of use of the system, etc., is provided by simply changing the program in the set condition calculating means 402.

Figure 9:
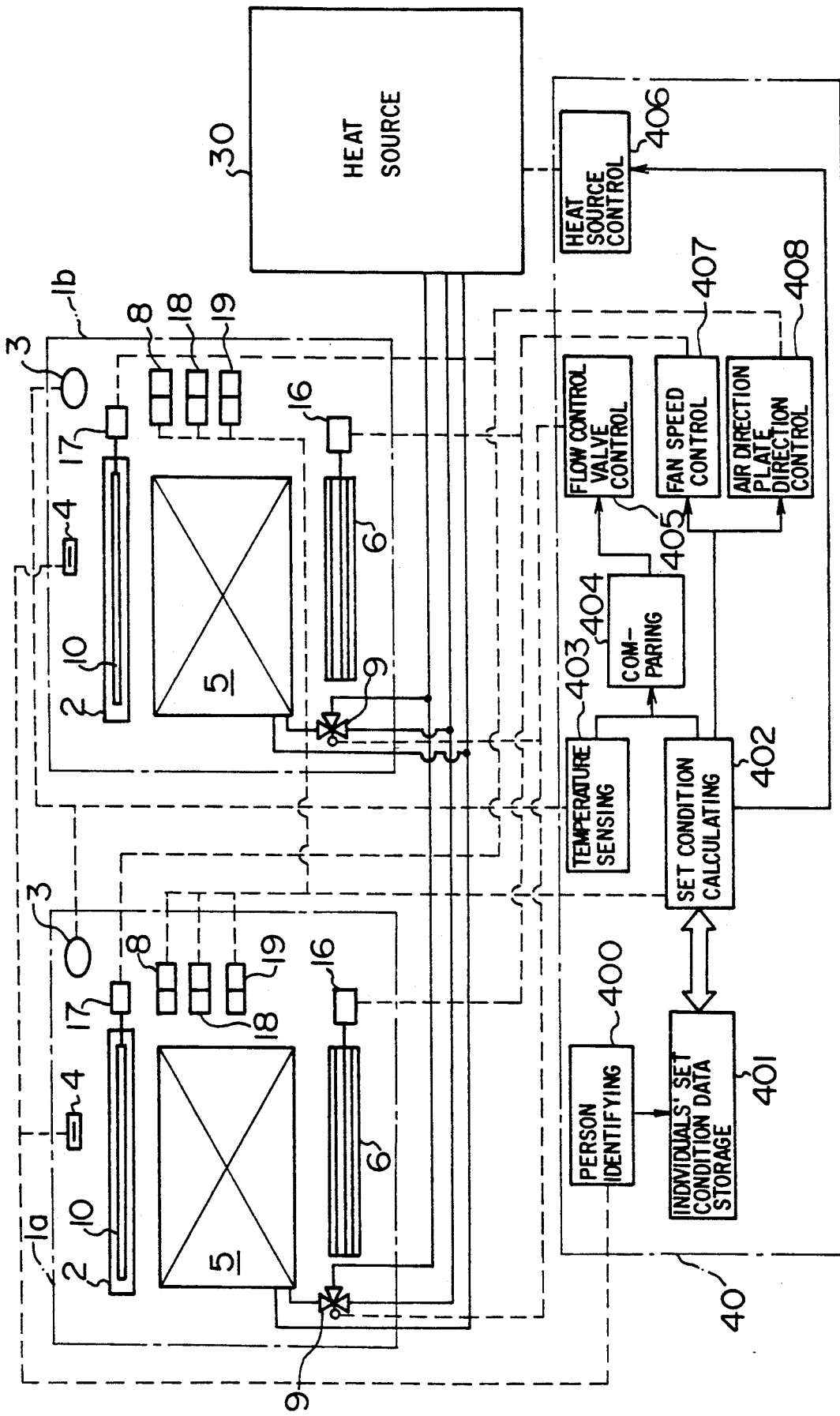
FIG. 9 is a schematic of an air conditioning system as a second embodiment of the present invention.

FIG. 9 shows the structure of an air conditioning system as a second embodiment of the present invention. The particular embodiment of FIG. 9 includes fan speed control means 407 for controlling driver 16 of fan 6 to change a quantity of a blowout wind, wind direction plate control means 408 for controlling driver 17 of wind direction plate 10 to change the direction of blowout wind, manual wind quantity adjusting switch 18 and manual wind direction adjusting switch 19, in addition to a structure similar to that of the first embodiment.

In the present embodiment, the temperatures in the partitioned regions as well as the quantity (speed) and direction of the blowout wind can be changed. Individuals' set condition data storage 401 stores personal past set temperatures and measured temperature values as well as set and measured values of the wind quantity and direction. Set target calculating means 402 determines the set temperature, and fan speed and the direction of the wind direction plate in accordance with the past set and measured values of the wind quantity and direction. When wind quantity adjusting switch 18 and wind direction adjusting switch 19 are operated, set target calculating means 402 changes the set values of the fan speed and of the direction of the wind direction plate.

According to the present embodiment, the wind quantity and direction can be set to each personal preference, so that the air which is adjusted comfortably not only in temperature, but also in wind quantity and direction is realized.

Figure 10:
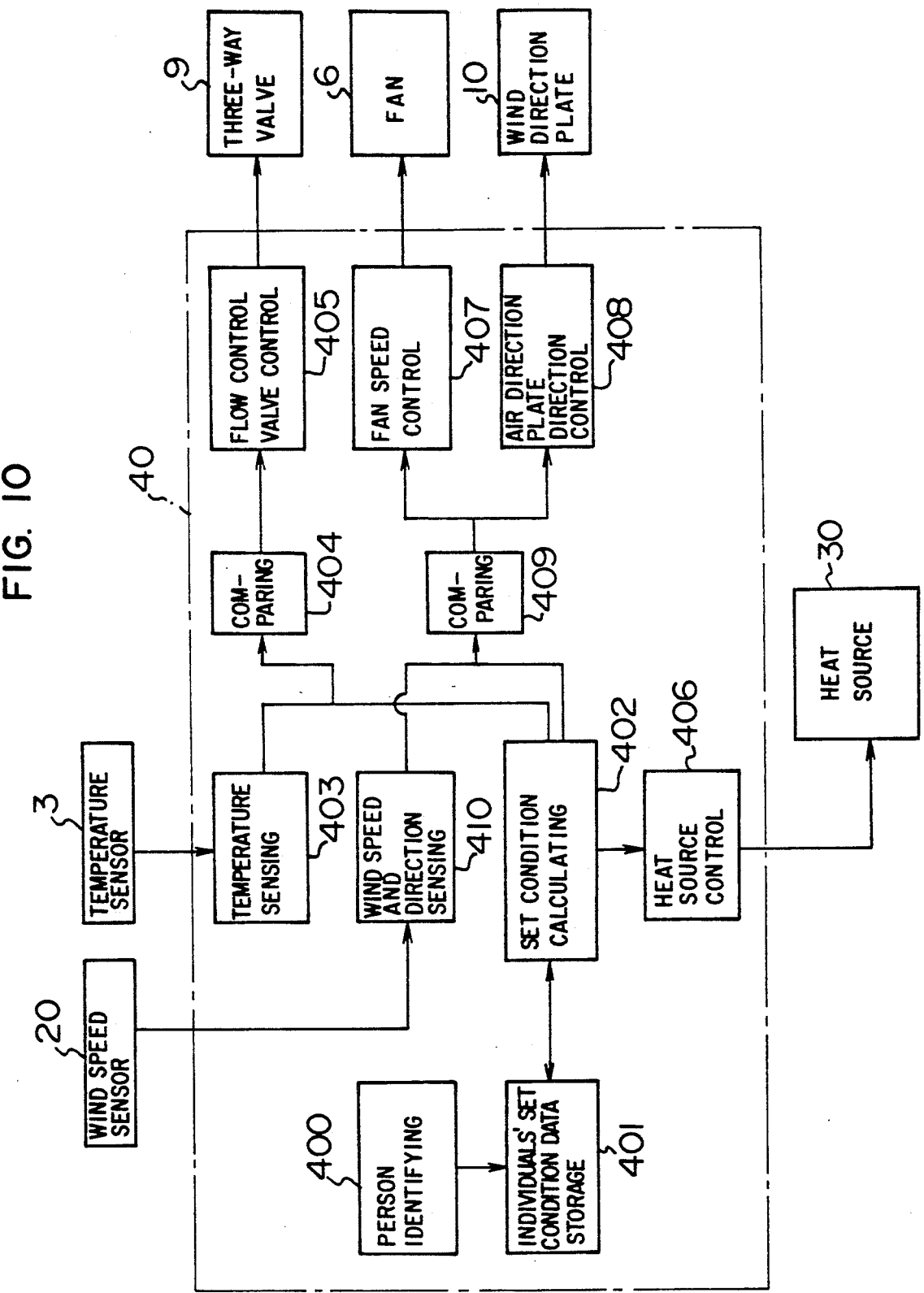
FIG. 10 is a schematic of a controller of an air conditioning system as a third embodiment of the present invention.

FIG. 10 is a schematic of a controller as a further or third embodiment of the present invention. In the present embodiment, comparator 409 compares the wind speed and direction values obtained from wind speed and direction sensor 20 and wind speed and direction detector 410 with the set wind speed and direction values determined by set condition calculating means 402 to control the fan speed and the direction of the wind direction plate in accordance with the difference. The other remaining structure is similar to that of FIG. 9, so that a further description thereof will be omitted. Provision of the wind speed and direction sensor serves to provide improved fine control of wind speed and direction.

The fan speed and the direction of the wind direction plate can be independently set similar to the procedure for setting the temperature in accordance with the corresponding data on the past set value or sensor sensed value. If the comfortableness evaluation index at that time is calculated from the set temperature and wind speed, and maintained substantially constant by changing the wind speed until the temperature arrives at the set value, a sensation of comfortableness is obtained directly after the system is used. PMV (Predicated Mean Vote) may be used as the comfortableness evaluation index.

When the wind speed and direction are controlled, the wind speed and direction sensor is preferably placed near the human body. Even if the wind speed and direction sensor is not used, a more comfortable sensation is provided by putting into the control program the data obtained by previously measuring or simulating the wind speed and direction around the human body obtained when the wind quantity provided by the fan, the direction of the wind direction plate and the set temperature are changed in design.

In the present embodiment, control of the wind speed and direction is provided on the basis of the individuals' past data in addition to control of the set temperature, so that comfortable air conditioning satisfying the individuals' preference is automatically provided. By providing a control such that the comfortableness evaluation index is constant at the beginning of use of the system, a comfortable sensation is obtained directly after the beginning of use of the system.

Figure 11:
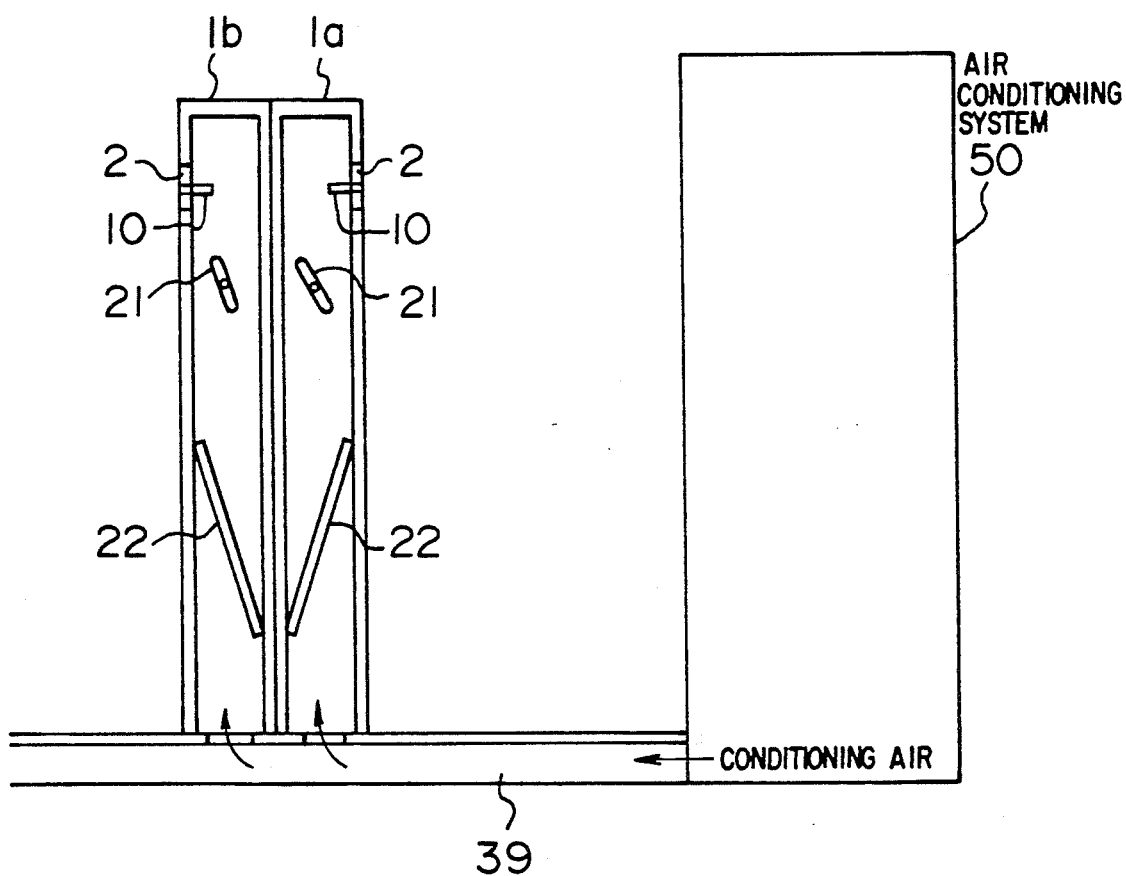
FIG. 11 is a cross sectional view of an air conditioning system as a fourth embodiment of the present invention.
Figure 12:
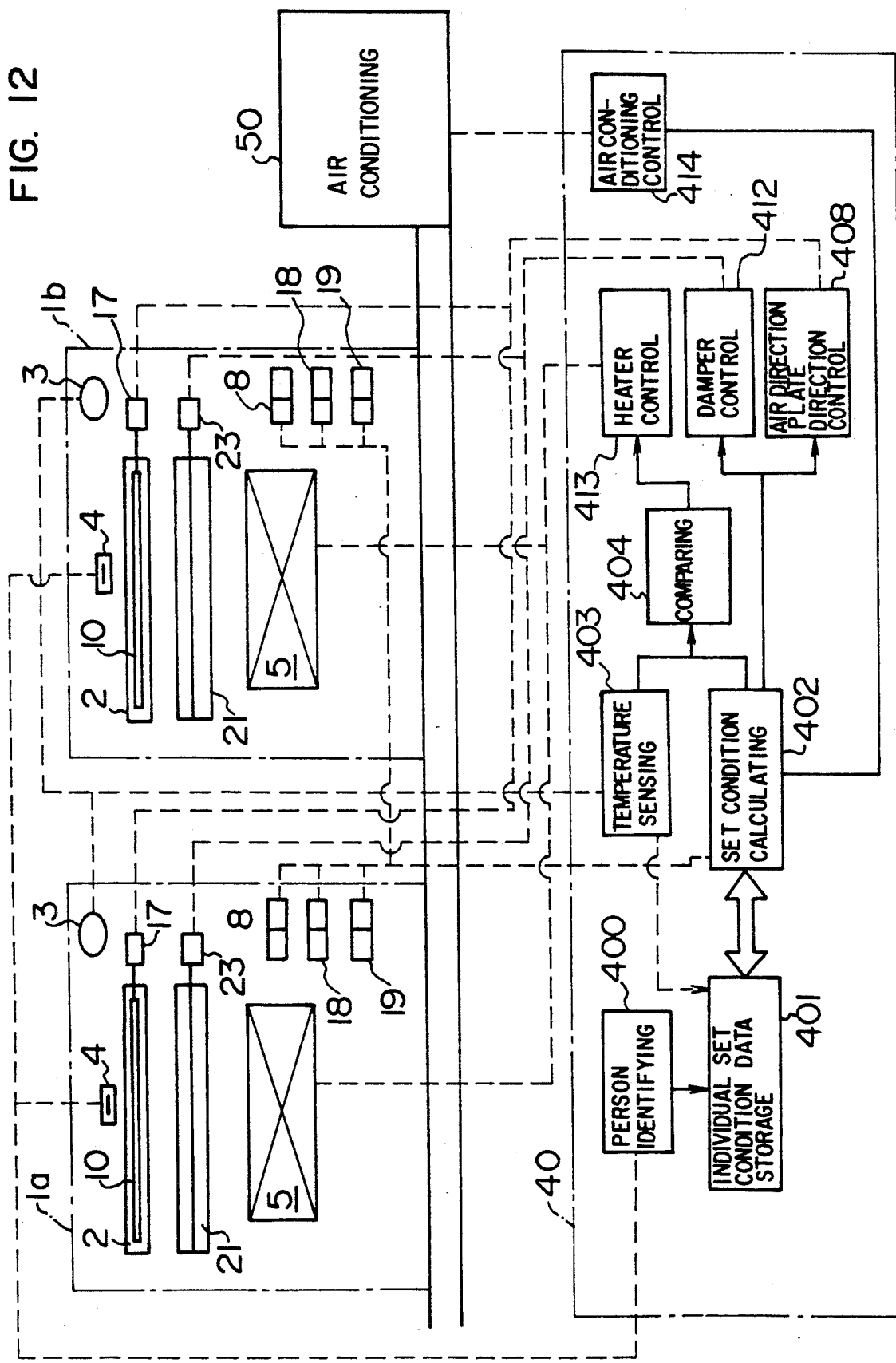
FIG. 12 is a schematic of an air conditioning system as a fourth embodiment of the present invention.

FIG. 11 is a cross-sectional view of an air conditioning system as a still further embodiment or fourth embodiment of the present invention. FIG. 12 is a schematic of the system. In the present embodiment, air conditioning system 50 supplies the conditioned air to partitions 1a, 1b, through a duct comprising a space 39 under the floor. Alternatively, a separate duct may be provided under the floor. Any type of air conditioning system may be used as air conditioning system 50 as long as it can cool and heat the air. Air conditioning system 50 may be provided in space 39 under the floor. Damper 21 adjusts a quantity of blowout wind. Electrical heater 22 heats the conditioned air in the respective partitions. While the quantity of wind can be adjusted without providing the electrical heater, it is more comfortable with the electrical heater operating. In FIG. 12, the structure and control of controller 40 is the same as the second embodiment except that damper 21 is controlled by damper control means 412, and the temperature of heater 22 is controlled by heater control means 413, and the air conditioning system 50 is controlled by air conditioning control means 414. Since in the present embodiment the air temperature is adjusted by electrical heater 22, the set temperature lower than the air temperature obtained when the heater 22 is stopped is required. If there is a partitioned region, the temperature felt by human body is lowered by increasing the quantity of wind or by lowering the temperature of the conditioned air by adjusting air conditioning system 50.

As just described above, by controlling heater 22, a comfortable space satisfying an each person's preference is provided.

Figure 13:
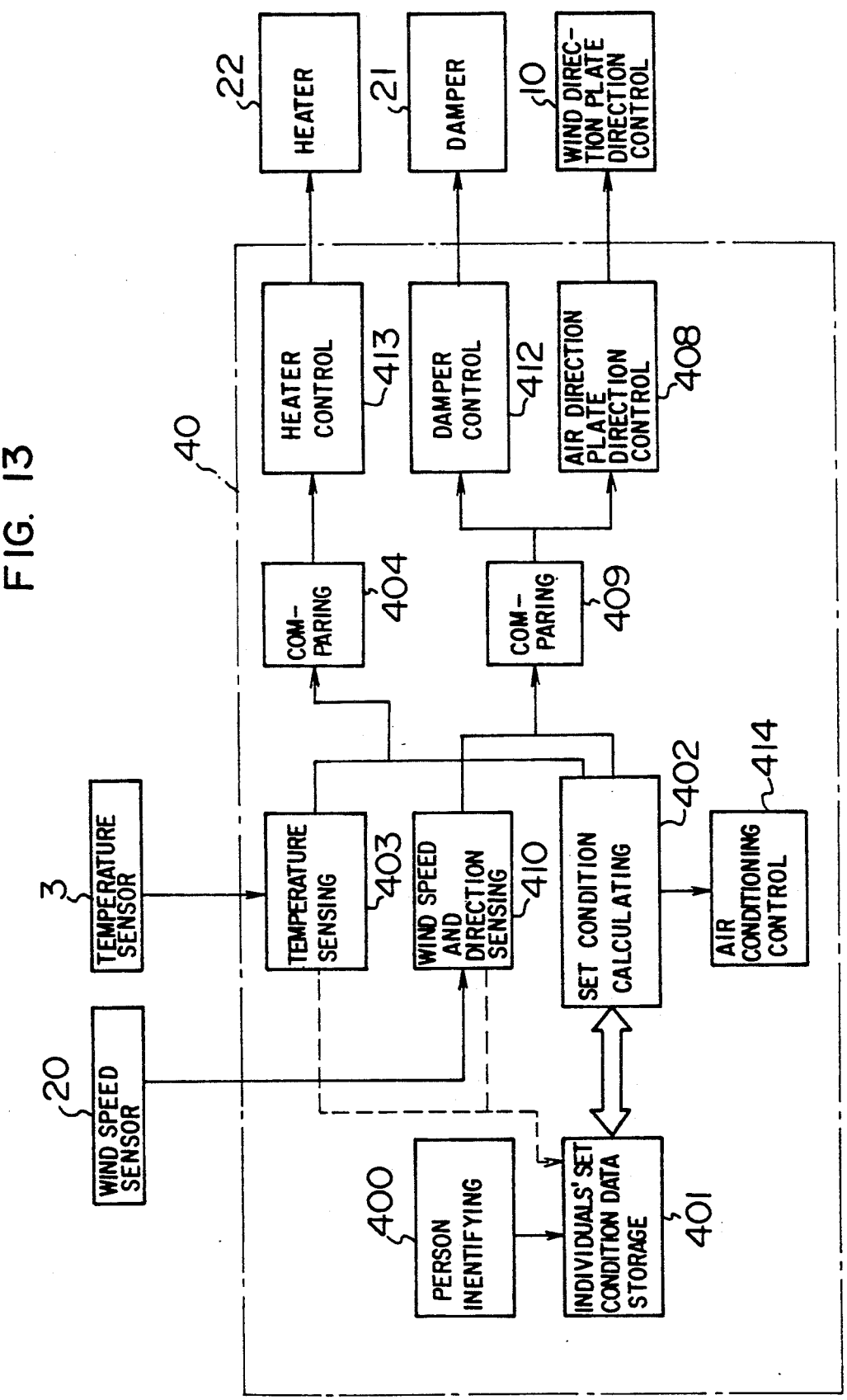
FIG. 13 is a schematic of an air conditioning system as a fifth embodiment of the present invention.

FIG. 13 is a schematic of an air conditioning system as a still further or fifth embodiment of the present invention. It includes a combination of the air conditioning system of the FIG. 4 embodiment with a wind speed and direction sensor 20. A measured value of the wind speed and direction obtained by a wind speed and direction sensor 20 and a wind speed and direction detector 410 is compared with a set value by comparators 404, 409. A damper control 412 and a wind direction plate control 408 control a damper driver 23 and a wind direction plate driver 17 on the basis of the respective differences provided by the comparators 404, 409. The remaining structure of the system is similar to that of the fourth embodiment of FIG. 12. The control method is similar to that provided by the third embodiment of FIG. 10.

Since the embodiments of FIGS. 12 and 13 use space 7 under the floor as a duct, partitions 1a, 1b can be provided in any places in the room.

Figure 14:
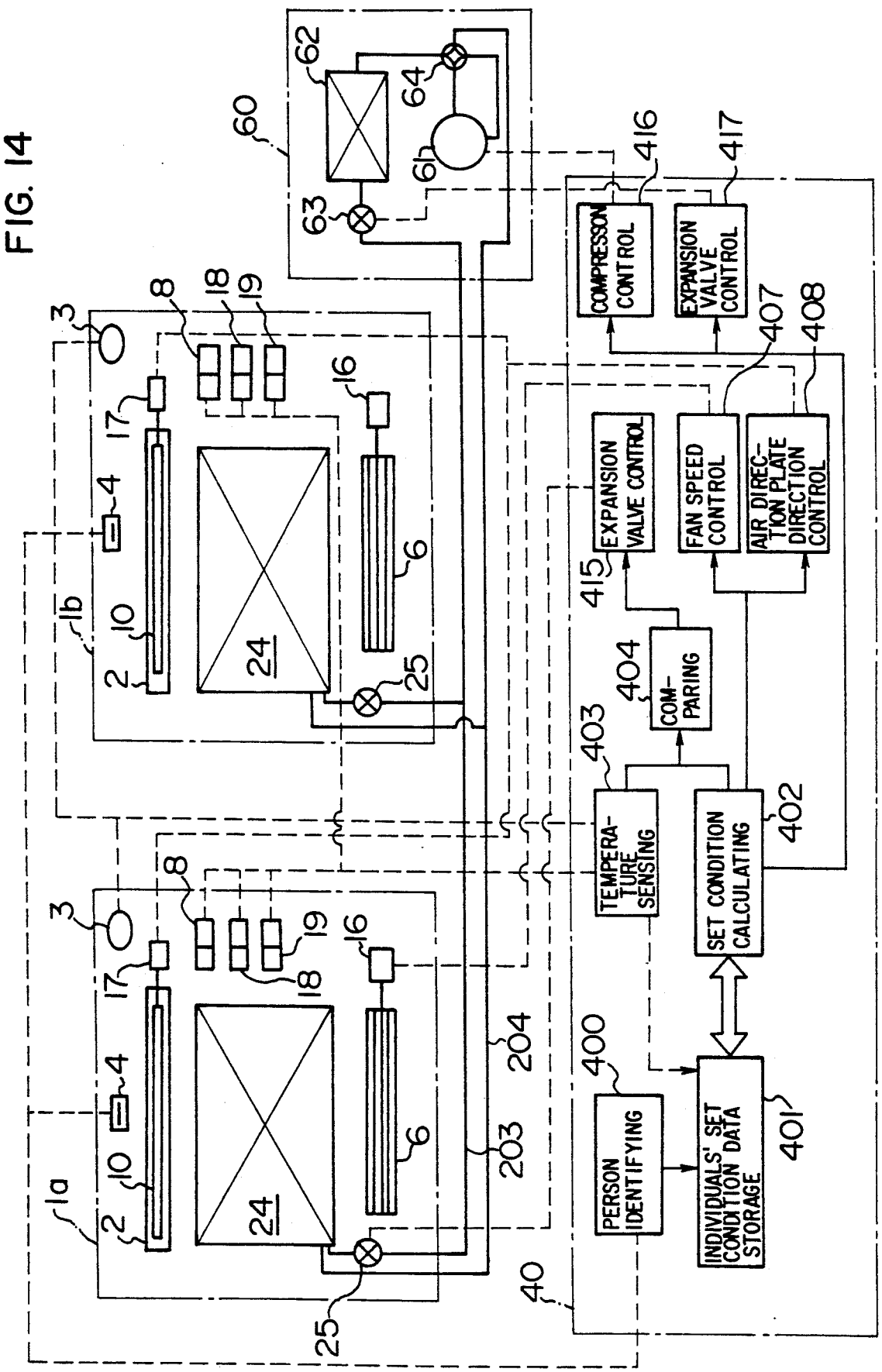
FIG. 14 is a schematic of an air conditioning system as a sixth embodiment of the present invention.

FIG. 14 is a schematic of the system of a further or sixth embodiment of the present invention. The structure of the partitions are similar to those of FIG. 3. The numeral 24 denotes a heat exchanger installed in the partition. The numerals 203, 204 denote a coolant pipe for flowing a coolant. The numeral 25 denotes an electrical expansion valve. The numeral 60 denotes a so-called outdoor machine used in a room air conditioner (hereinafter referred to also as an outdoor machine) and includes compressor 61, heat exchanger 62, expansion valve 63 and four-way valve 64. The numeral 40 denotes a controller. Like the embodiments of FIGS. 1-13, if ID card 13 is put in position, person identifying means 400 identifies the owner of the card. Set condition calculating means 402 determines the temperature, wind speed and direction in the region in accordance with the data on his past set conditions stored in individuals' set condition data storage 401. These set values are changed when temperature adjusting switch 8, wind speed adjusting switch 18 and wind direction adjusting switch 19 are operated; for example, the temperature set value is changed in accordance with the rules shown in FIG. 5. Expansion valve control means 415 as temperature adjusting means, fan speed control means 407, wind direction plate control means 408, control expansion valve 25, fan driver 16 and wind direction plate driver 17 provided in each of the partitions in accordance with the set values and the region temperature detected by temperature sensor 3 such that the temperature, wind speed and direction in the region satisfy the individuals' preferred conditions. Compressor speed control means 416 controls the speeds of compressor 61 and outdoor machine expansion valve control means 417 controls outdoor expansion valve 63. The compressor speed and the outdoor expansion valve are controlled independently referring to the corresponding set temperatures.

According to the present embodiment, a coolant flows through the pipe, so that there is no anxiety about water leakage and ice forming.

The present embodiment provides improved fine control over the wind speed and direction using the wind speed and direction sensor as in the embodiment of FIG. 10. By changing the coolant circuit, etc., a system can be provided which is operable simultaneously in both the cooling and heating modes.

Figure 15:
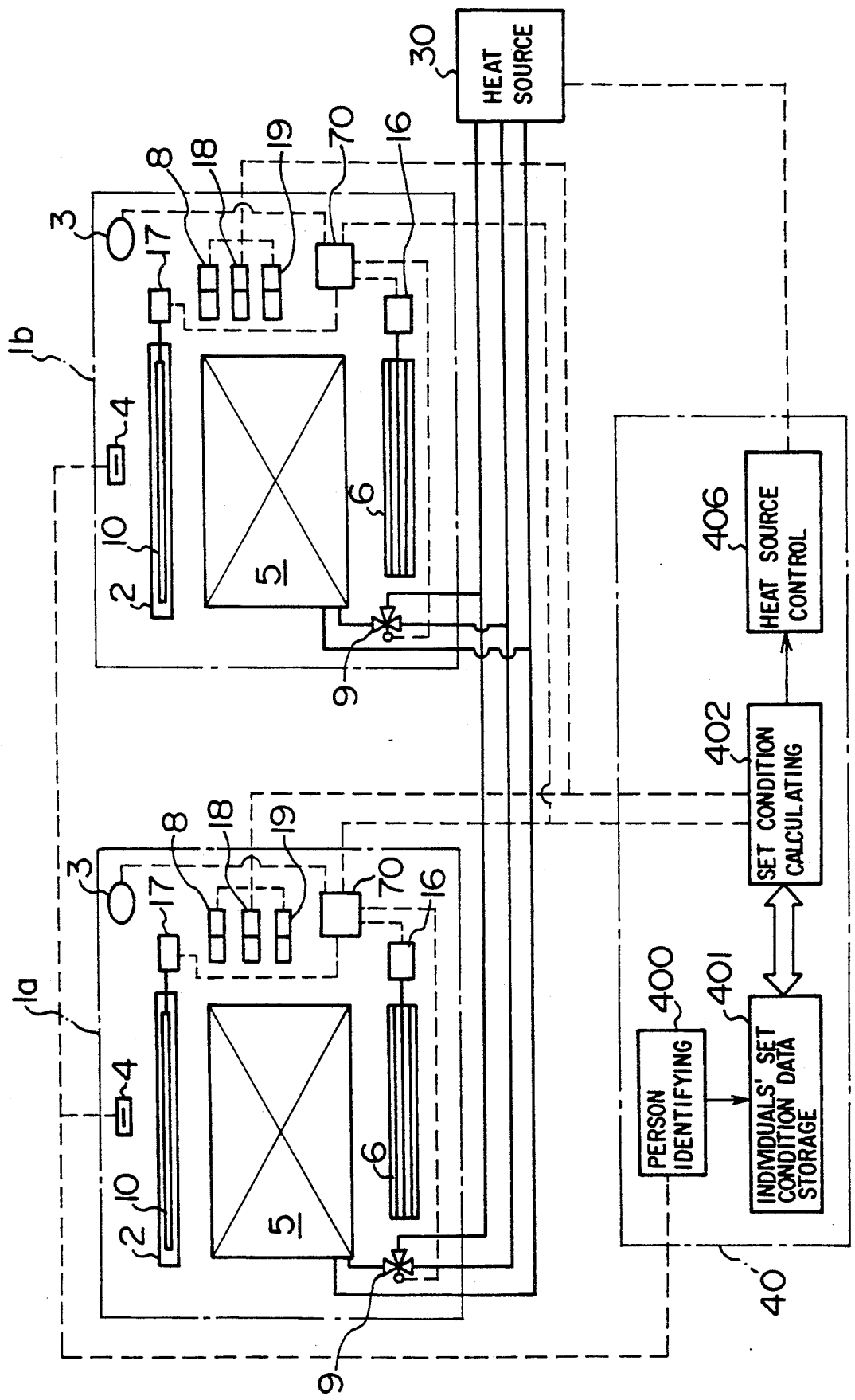
FIG. 15 is a schematic of an air conditioning system as a seventh embodiment of the present invention.
Figure 16:
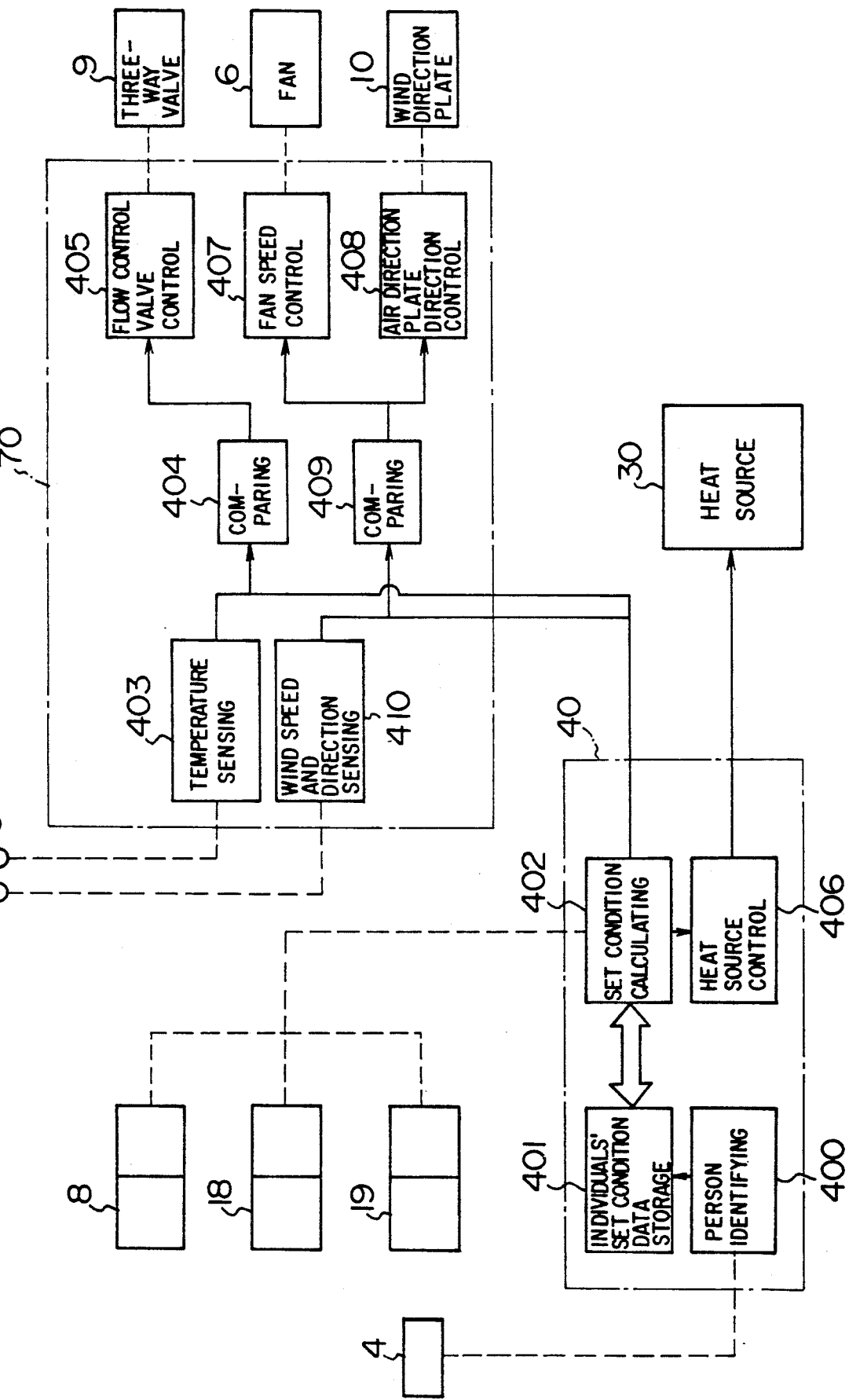
FIG. 16 is a block diagram of the air conditioning system of FIG. 15.

FIG. 15 is a schematic of a system as a further or seventh embodiment of the present invention. The structure of partitions 1a, 1b, heat source 30 and pipes 200-202 is substantially the same as that of the FIG. 9 or second embodiment. The individual partitions 1a, 1b include a controller 70 for control of the intra-region setting conditions. FIG. 16 is a block diagram of controller 70 and main control unit 40. Person identifying means 400 identifies the person as the owner of the card on the basis of the data from ID card reader 4. Set condition calculating means 402 determines the set values of the temperature, and wind speed and direction in accordance with the person's past set conditions stored in individual set condition data storage means 401. If switches 8, 18, 19 are operated, the set conditions are changed. Intra-region set condition controller 70 includes temperature detector 403, wind speed and direction detector 410, comparing means 404, three-way control means 406, fan speed control means 407 and wind direction plate control means 408. The respective operations of these elements are similar to those of the FIG. 9 or second embodiment of FIG. 9 and of the FIG. 10 or third embodiment.

In the present embodiment, intra-region set condition controller 70 is installed in each partition to simplify the wiring between controller 70 and that partition. Since each partition has the controller, advantageously, additional provision of partitions does not greatly increase the load on main controller 80. The FIG. 12 or fourth embodiment and the FIG. 14 or fifth embodiment each may have a structure similar to that of the present embodiment.

Set condition calculating means 402 may be provided in intra-region set condition controller 70 in each partition. In that case, it is preferable that no set condition calculating means 402 is provided in controller 40. If there is a person who has started to use the partition, the data on his past set conditions is transferred from individual set condition data storage means 401 to intra-region set condition controller 70 and, when that person terminates the use of the partition, data on that person's use conditions is transferred from intra-region set condition controller 70 to individual's set condition data storage 401 in controller 40.

Figure 17:
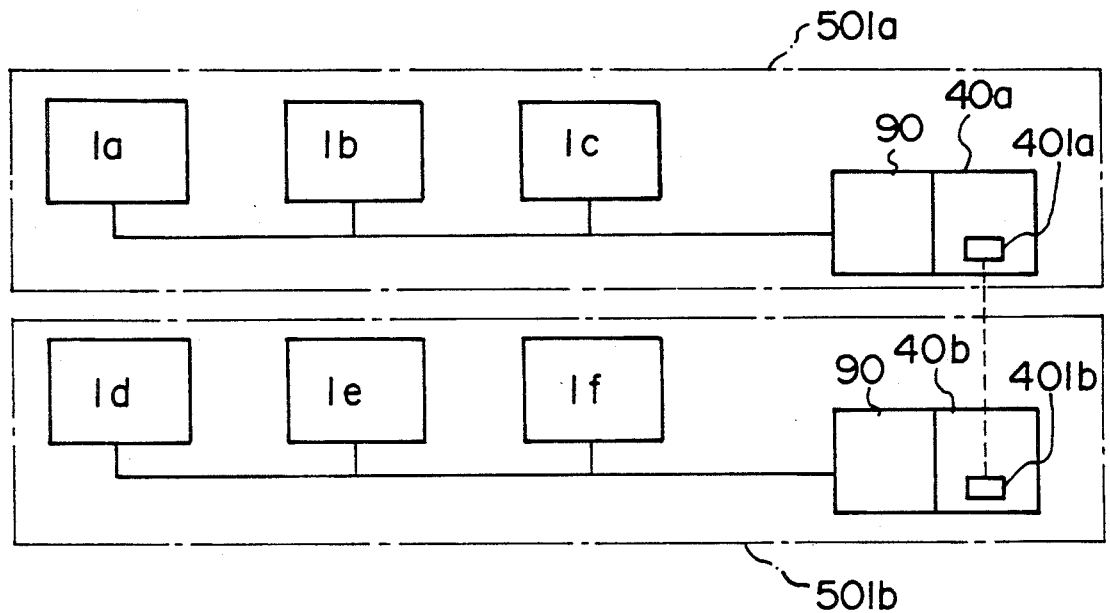
FIG. 17 is a schematic of an air conditioning system as an eighth embodiment.

FIG. 17 is a schematic of a controller indicative of a further or eighth embodiment of the present invention. The numeral 90 denotes any one of a heat source, an air conditioning system and an outdoor machine. The numerals 501a, 501b denote a subsystem which has the same structure as one of the FIGS. 1-16 or first-seventh embodiments. Communication line 600 is provided connecting storages 401a and 401b for storing data on the individuals' set conditions and constituting parts of controllers 40a, 40b. If no data on that individual is recorded in one of the individuals' set condition storages, the other storage is read to determine if the individual data is recorded. If that data is present there, the set conditions are calculated using the data. According to the present embodiment, even when an individual uses a different subsystem, the environment preferred by the individual is obtained. A individuals' set condition storage may be provided which is shared by the respective subsystems for inquiring purposes to produce similar effects.

While in the above embodiments the air conditioning systems involving partitions have been described, other types of air conditioning systems may be implemented, of course.

Figure 18:
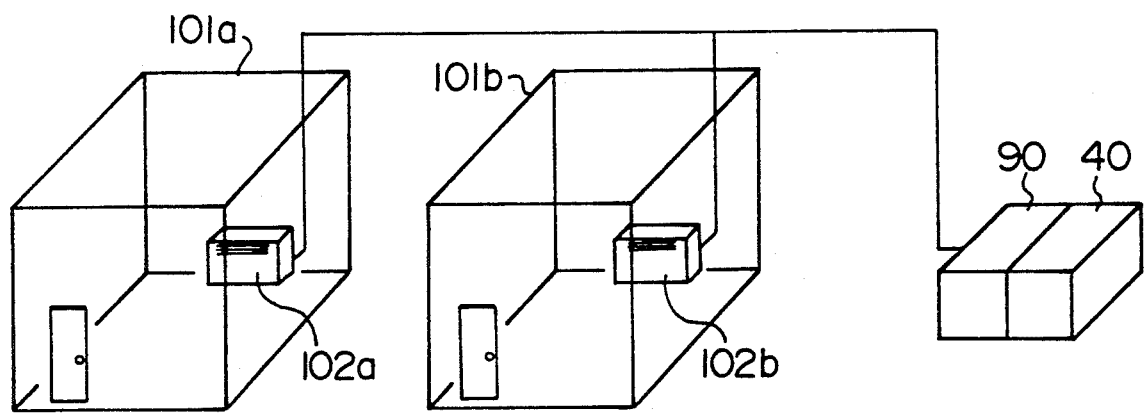
FIG. 18 is a perspective view of an air conditioning system as a ninth embodiment of the present invention.

FIG. 18 is a perspective view of an air conditioning system as a further or ninth embodiment of the present invention. The numerals 101a, 101b each denote one room or a region partitioned in a room. Each of the numerals 102a, 102b is an air conditioning device; 90 denotes a heat source or an outdoor machine; and 40 denotes a controller. The structures of air conditioning devices 102a, 102b, controller 40 and heat source 90 are similar to those of the embodiments of FIGS. 4, 9 and 14.

According to the present embodiment, personal preferred room temperature and wind speed are obtained in his room or in a partitioned region.

Figure 19:
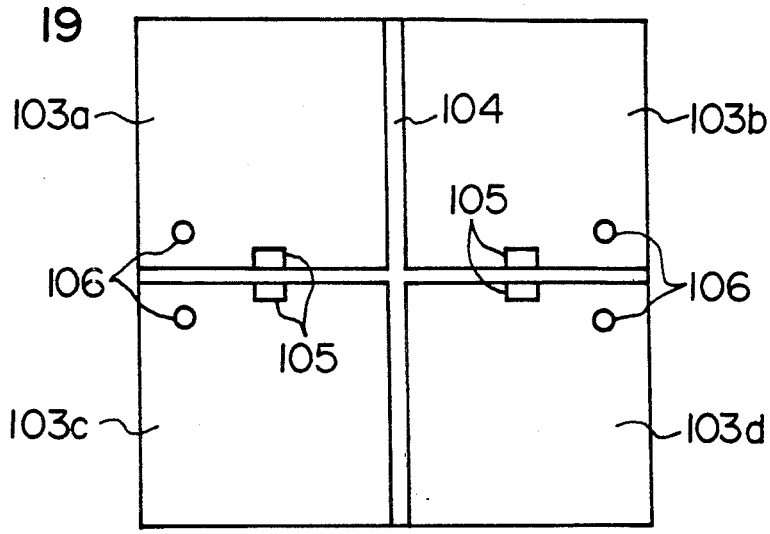
FIG. 19 is a plan view of an air conditioning system as a tenth embodiment of the present invention.
Figure 20:
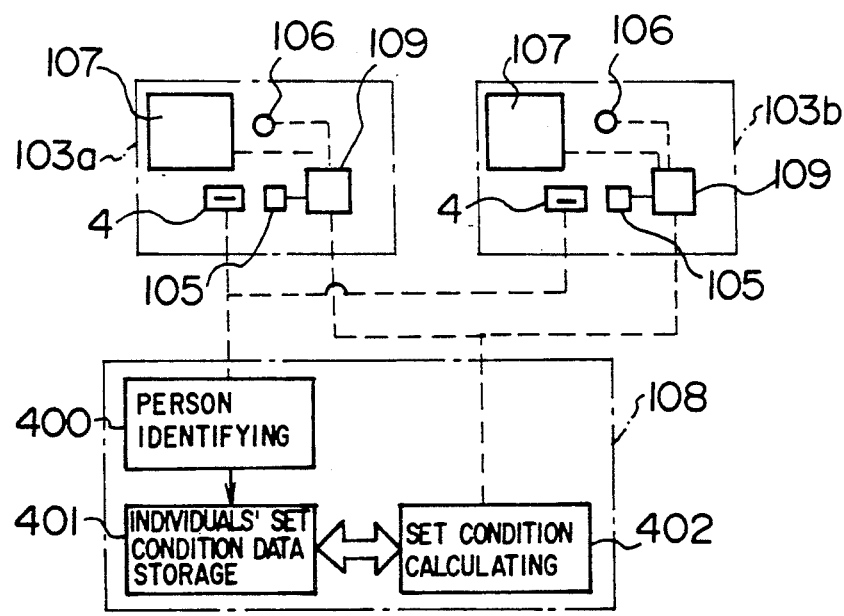
FIG. 20 is a schematic of an air conditioning system of FIG. 19.

FIG. 19 is a plan view of a further or tenth embodiment of the present invention. FIG. 20 is a schematic of a system in the embodiment. In FIGS. 19 and 20, the numerals 103a-103d denote four regions; each are defined by partition 104 as an example. The numeral 104 may denote a partition, and the numerals 103a-103d may denote four rooms. Alternatively, the numeral 104 may denote a partition which partitions the room, and the numerals 103a-103d may denote the partitioned regions. Each region 103a-103d includes floor heating means 107, temperature adjusting switch 105, floor temperature sensor 106, floor heating control unit 109 and ID card reader 4. Temperature condition setting unit 108 is shared by all the regions.

The operation of the system of the present embodiment will be described with reference to FIG. 20. If an ID card is put into ID card reader 4, set condition calculating means determines a set temperature on the basis of the data on the person's past set temperature stored in individuals' set condition data storage 401. Floor heating control unit 109 controls heating means 107 in accordance with the set temperature. If the set temperature is changed by changing temperature setting conditions 105, set condition calculating means 402 determines a new set temperature. A change in the individuals' set temperature is recorded in individuals' set condition data storage 401. An initial value of the set temperature may be determined on the basis of the temperature sensed by temperature sensor 106. This method is similar to that used in the first embodiment, as described in detail.

According to the present embodiment, the temperature is automatically set to the individuals' preferred one for floor heating to realize comfortable air conditioning. More comfortable air conditioning is provided through partition air conditioning and floor heating adjustment and by a combination of the present embodiment with one of the first-eighth embodiments. The comfortableness of each region may be improved by combination of the present embodiment with the ninth embodiment.

Figure 21:
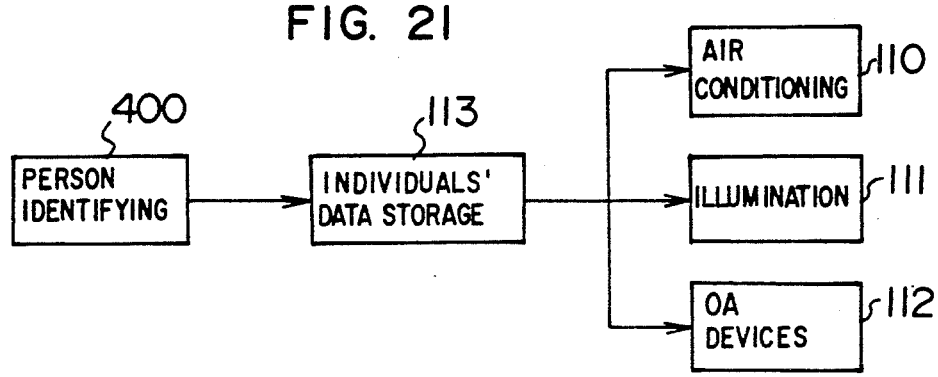
FIG. 21 is a schematic of an air conditioning system as an eleventh embodiment of the present invention.

FIG. 21 is a schematic of another or eleventh embodiment of the present invention. Air conditioning similar that provided by one of the first-eleventh embodiments is provided by the use of the ID card, and the brightness of illumination may be adjusted in accordance with the individuals' data. The setting for start-up of OA devices may be performed by the individuals' data. The individuals' data on air conditioning, illumination, OA devices, etc., are filed for each person in individuals' data storage means 113.

According to the present embodiment, an environment suitable for each person including the illuminance of illumination is realized automatically and systematically.

While in the above embodiments a method of identifying each person with his ID card has been illustrated, another method described below may be used.

Figure 22:
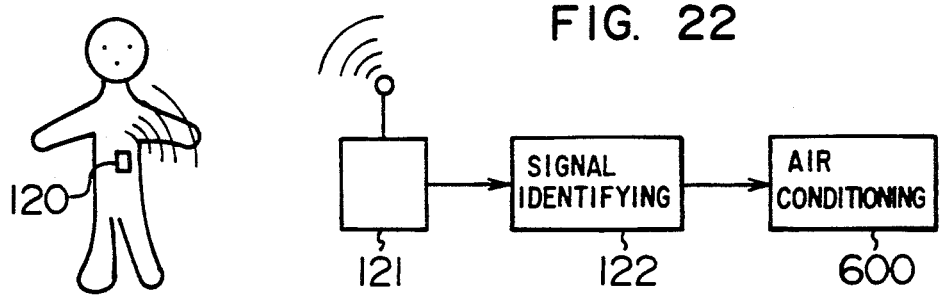
FIG. 22 is a schematic of an air conditioning system as a twelfth embodiment of the present invention.

FIG. 22 is a schematic of a further or twelfth embodiment of the present invention. Each person carries a transmitter 120 which generates his identification signal. Receiver 121 receives the identification signal, and signal identifying means 122 identifies that person and controls air conditioning system 600 in accordance with the result using the method described with reference to the respective FIGS. 1-12 embodiments.

Figure 23:
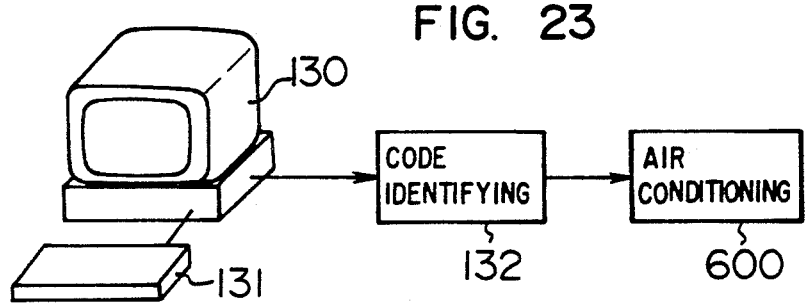
FIG. 23 is a schematic of an air conditioning system as a thirteenth embodiment of the present invention.

FIG. 23 is a schematic of a further or thirteenth embodiment of the present invention. When each person uses computer 130, he is required to input his code through keyboard 131 into the computer. That person is identified by the code to thereby perform air conditioning.

Figure 24:
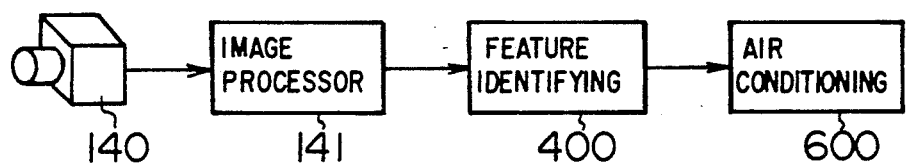
FIG. 24 is a schematic of an air conditioning system as a fourteenth embodiment of the present invention.

FIG. 24 is a schematic of a further or fourteenth embodiment of the present invention. Image processor 141 extracts the features of a person on the basis of the image caught by camera 140, feature identifying means 400 identifies that person and air conditioning system 600 then provides air conditioning for the person.

Figure 25:
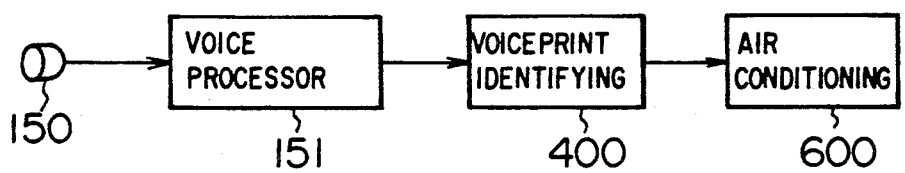
FIG. 25 is a schematic of an air conditioning system as a fifteenth embodiment of the present invention.

FIG. 25 is a schematic of a further or fifteenth embodiment of the present invention. The embodiment processes the voice input through microphone 150 with voice processor 151, identifies that person with voiceprint identifying means 400 and the air conditioning system 600 provides air conditioning in accordance with the result.

Figure 26:
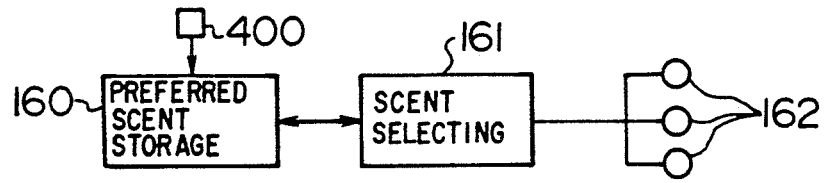
FIG. 26 is a schematic of an air conditioning system as a sixteenth embodiment of the present invention.

FIG. 26 is a schematic of a further or sixteenth embodiment of the present invention. It includes person identifying means 400, scent preference storage means 160, scent selecting means 161 and scent generators 162. Person identifying means 400 identifies a person. Scent selecting means 161 selects the scent preferred by that person on the basis of the data on the scent used by him in the past and stored in storage means 160, and scent generator 162 produces that scent. The data on the scent kind and use time is stored in scent preference storage means 160.

A scent may be automatically changed in accordance with the correspondence between the scent used by that person and the time when the scent was used. A method of storing a changing pattern of the person's possible usage of the personal preferred scent calculated from several examples of the scents used by the person may be used.

According to the present embodiment, the individuals' preferred scents are automatically selected, uncomfortable scents are removed, and hence comfortable environments are provided.

As described above in detail, according to the present invention, each of the individual's preferred comfortable environments is automatically realized by calculating set values for that person in accordance with his current or past set conditions even if he is in any region. Changes in his preference to the environmental conditions are accommodated easily by several operations.

According to the present invention, by partitioning one room into a plurality of regions, the environments preferred by the individuals are automatically realized in the corresponding regions.

Second, according to the present invention, air cooling and heating can be performed simultaneously in the corresponding regions. Even if a person is in a partially high load region where, for example, a computer is installed, comfortableness is not impaired because appropriate air conditioning is provided in that region.

Third, by controlling the comfortableness evaluation index at a substantially constant value, a sensation of comfortableness is obtained from directly after the start of air conditioning.

Fourth, the air quantity and direction are controlled so as to satisfy the individuals' preference, so that a sensation of uncomfortableness is eliminated and hence a comfortable space is provided.

Fifth, storage means for storing the set and measured values of the individuals' environmental conditions may be provided so as to be shared by all the associated subsystems, so that the entire system can easily be increased and expanded in scale.

Sixth, illumination, scent, etc., are controlled similarly to obtain a comfortable space satisfying each person's preference.

What is claimed is:

1. An air conditioning system comprising:
    a heat source for supplying one of a cooling medium or a heating medium to a plurality of air-conditioning spaces;
    air-conditioning means provided in each of the air-conditioning spaces for conditioning air by using one of the cooling medium or the heating medium,
    a controller for controlling said air-conditioning means to obtain a temperature in accordance with a predetermined air-conditioning condition; and
    identifying means for identifying each person who uses the air conditioning spaces by obtaining identification data;
    a memory for the storage of data; and
    storage means for storing personal data in said memory, said personal data including said predetermined air conditioning condition and corresponding to said identification data; and
    calculating means for providing said controller with said predetermined air-conditioning condition from said memory by obtaining said personal data corresponding to said identification data.

2. An air conditioning system comprising:
    a heat source for supplying one of heating medium or a cooling medium to a plurality of air conditioning spaces;
    air conditioning means provided in each of the air conditioning spaces for conditioning air by using one of the cooling medium or the heating medium;
    a controller for controlling said air conditioning means in accordance with a predetermined air conditioning condition;
    an ID card reader for reading an ID card of a person, said ID card including personal data including said predetermined air conditioning condition; and
    calculating means for obtaining said personal data from said ID card and providing said controller with said predetermined air conditioning condition.

3. An air conditioning system according to claim 1, wherein the identifying means includes an image processor for processing an image input from a camera.

4. An air conditioning system according to claim 1, wherein the identifying means include a voice print identifying means for identifying a voiceprint of a vice input inputted through a microphone.

5. An air conditioning system comprising:
    a heat source for supplying one of a cooling medium and a heating medium to a plurality of air conditioning spaces;
    a flow control valve for mixing the cooling medium and the heating medium by adjusting a flow of the cooling medium and a flow of the heating medium to obtain a mixed medium;
    a controller for controlling the flow control valve in accordance with a predetermined temperature;
    a heat exchanger for exchanging heat between the mixed medium and air; and
    identifying means for identifying a person in the air-conditioning spaces by obtaining personal data including said predetermined temperature and identification data;

a memory for the storage of data;

storage means for storing the personal data including said predetermined temperature obtained from the identifying means in said memory; and calculating means for reading said personal data from said memory by said identification data and providing said controller with said predetermined temperature.

6. An air conditioning system comprising:

an outdoor machine including a compressor for conducting a cooling medium to a plurality of air-conditioned spaces, a heat exchanger, an expansion valve and a four-way valve;

air-conditioning means provided in each of air conditioned spaces, said air-conditioning means including a heat exchanger;

a controller for controlling said air-conditioning means in accordance with a predetermined air-conditioning condition; and identifying means for identifying each person in each of said air-conditioned spaces by personal data including said predetermined air-conditioning condition a memory for the storage of data;

storage means for storing said personal data including said predetermined air conditioning condition in said memory; and calculating means for reading said personal data from said memory and providing said controller with said predetermined air-conditioning condition.

7. An air conditioning system comprising:

a plurality of floor heating units provided in each of a plurality of air-conditioning spaces;

a floor controller for controlling the respective floor heating units in accordance with a predetermined air conditioning condition;

means for identifying a person by obtaining personal data including identification data and said predetermined air conditioning condition;

a memory for the storage of data;

storage means for storing said personal data including said identification data in said memory, calculating means for obtaining said predetermined air conditioning condition from said memory and providing said controller with said predetermined air conditioning condition.

8. An air conditioning system according to any one of claims 1, 5, 6, and 7, wherein said calculating means obtain a predetermined air conditioning condition previously stored by said storage means.

9. An air conditioning system according to claim 8, wherein the air conditioning system further comprises an additional memory for storing said personal data and a communication line communicating with another controller provided in a space of said air conditioning spaces.

10. An air conditioning system according to claim 8, wherein the air conditioning system further comprises a partition defining each of the air conditioning spaces and an air diffuser for diffusing the conditioned air.

11. An air conditioning system according to claim 8, wherein the personal data includes a set temperature, illumination and scent.

12. An air conditioning system according to claim 8 wherein said air conditioning system further comprises a plurality of communication lines, and, wherein said controller is one of a plurality of controllers, each of said controllers are positioned in each of said air conditioning spaces, and wherein all of said controllers are connected to said memory through said communication lines to obtain said personal data.

13. An air conditioning system according to any one of claims 1, 2, 5, 6 and 7, further including means for measuring air temperatures for each of said air conditioning spaces and storing each of the air temperatures at a memory location of said memory indicative of each of said air conditioning spaces, each of said measured air temperatures corresponding to said air conditioning condition of each of said air conditioning spaces.

14. An air conditioning system according to claim 3, wherein the air conditioning system further comprises a partition defining each of the air conditioning spaces and an air diffuser for diffusing the conditioned air therethrough.

15. An air conditioning system according to claim 13, wherein the air conditioning system further comprises an additional memory for storing said personal data and a communication line communicating with another controller provided in a space of said air conditioning spaces.

16. An air conditioning system according to claim 3, wherein the personal data includes a set temperature, illumination and scent.

17. An air conditioning system according to claim 13 wherein said air conditioning system further comprises a plurality of communication lines, and, wherein said controller is one of a plurality of controllers, each of said controllers are positioned in each of said air conditioning spaces, and wherein all of said controllers are connected to said memory through said communication lines to obtain said personal data.

18. An air conditioning system according to claim 13 wherein said air conditioning system further comprises a plurality of communication lines, and wherein said controller is one of a plurality of controllers, each of said controllers are positioned in each of said air conditioning spaces, and wherein all of said controllers are connected to said memory through said communication lines to obtain said personal data.

19. An air conditioning system according to any one of claims 1, 2, 5, 6 and 7 wherein the air conditioning system further comprises additional storage means for storing said personal data in an additional memory and a communication line for communicating with an additional controller provided in another space of said air conditioning spaces.

20. An air conditioning system according to claim 19, wherein the air conditioning system further comprises a partition defining each of the air conditioning spaces and an air diffuser for diffusing the conditioned air therethrough.

21. An air conditioning system according to claim 19, wherein the personal data includes a set temperature, illumination and scent.

22. An air conditioning system according to any one of claims 1, 5, 6 and 7, wherein said controller is one of a plurality of controllers positioned in each of the air conditioning spaces and said memory is one of a plurality of memories, said air conditioning system further comprising a plurality of communication lines connecting said memories with said controllers.

23. An air conditioning system according to claim 22, wherein said air conditioning system further comprises a partition defining each of the air conditioning spaces and an air diffuser for diffusion the conditioned air therethrough.

24. An air conditioning system according to claim 22, wherein the personal data includes a set temperature, illumination and scent.

25. An air conditioning system according to any one of claims 1, 2, 5, 6 and 7, wherein the air conditioning system further comprises a partition defining each of the air conditioning spaces and an air diffuser for diffusing the conditioned air.

26. An air conditioning system according to claim 25, wherein the personal data includes a set temperature, illumination and scent.

27. An air conditioning system according to any one of claims 1, 2, 5, 6 and 7 wherein the personal data includes a set temperature, illumination and scent.

28. An air conditioning system according to claim 1, wherein said air-conditioning apparatus further comprises a heat exchanger;

wind velocity means for controlling a quantity of air at a predetermined temperature;

a wind direction changing means including a wind direction plate for controlling a direction of air; and an additional controller for controlling the direction of the wind direction plate.

29. An air conditioning system according to claim 28, wherein the quantity of air is controlled such that an comfortableness evaluation index is maintained substantially constant until a conditioned air temperature of the air is at a predetermined temperature.

* * * * *